United States Patent
Buerger et al.

(10) Patent No.: US 11,374,921 B2
(45) Date of Patent: Jun. 28, 2022

(54) AUTHORIZATION METHOD FOR THE RELEASE OR BLOCKING OF RESOURCES AND CLIENT

(71) Applicant: Deutsche Telekom AG, Bonn (DE)

(72) Inventors: Danilo Buerger, Augsburg (DE); Florian Puetz, Frankfurt am Main (DE); Frank Angermann, Dresden (DE)

(73) Assignee: DEUTSCHE TELEKOM AG, Bonn (DE)

( * ) Notice: Subject to any disclaimer, the term of this patent is extended or adjusted under 35 U.S.C. 154(b) by 275 days.

(21) Appl. No.: 16/713,072

(22) Filed: Dec. 13, 2019

(65) Prior Publication Data
US 2020/0195634 A1    Jun. 18, 2020

(30) Foreign Application Priority Data
Dec. 14, 2018   (EP) .................................... 18212665

(51) Int. Cl.
  *H04L 9/40* (2022.01)
  *H04L 9/08* (2006.01)
  *H04W 12/08* (2021.01)

(52) U.S. Cl.
  CPC ........ *H04L 63/0823* (2013.01); *H04L 9/0825* (2013.01); *H04L 63/0815* (2013.01); *H04L 63/10* (2013.01); *H04W 12/08* (2013.01)

(58) Field of Classification Search
  None
  See application file for complete search history.

(56) References Cited

U.S. PATENT DOCUMENTS

| | | | | |
|---|---|---|---|---|
| 7,650,313 B1* | 1/2010 | Blaze | .................. | G06Q 20/3674 705/64 |
| 8,719,952 B1* | 5/2014 | Damm-Goossens | ........................ | H04L 9/3226 726/28 |
| 8,924,715 B2* | 12/2014 | Schell | .................. | H04W 12/086 455/411 |
| 8,981,935 B2* | 3/2015 | Falk | ..................... | H04L 63/0492 340/5.1 |

(Continued)

FOREIGN PATENT DOCUMENTS

WO    WO 2018177720 A1    10/2018

OTHER PUBLICATIONS

Morris et al "Deploying OAuth with Cisco Collaboration," Solution Release, Whitepaper, Dec. 2017, pp. 1-24 (Year: 2017).*

*Primary Examiner* — Luu T Pham
*Assistant Examiner* — James J Wilcox
(74) *Attorney, Agent, or Firm* — Leydig, Voit & Mayer, Ltd.

(57) ABSTRACT

An authorization method for releasing or blocking resources includes, in case there is no connection between a provider and a resource owner: wirelessly transmitting a resource request from a client to the provider via an agent; wirelessly transmitting an authorization request from the provider to the client via the agent; wirelessly transmitting the authorization request from the client to the resource owner; wirelessly transmitting a receipt comprising an authorization response from the resource owner to the client; wirelessly transmitting the receipt from the client to the provider; and releasing or blocking a first resource in accordance with the authorization response comprised in the receipt.

4 Claims, 3 Drawing Sheets

(56) References Cited

U.S. PATENT DOCUMENTS

| | | | |
|---|---|---|---|
| 9,210,531 B1* | 12/2015 | Vu | H04W 4/60 |
| 9,215,075 B1* | 12/2015 | Poltorak | H04L 9/3268 |
| 9,313,208 B1* | 4/2016 | Letz | G06Q 10/0631 |
| 9,462,070 B2* | 10/2016 | Kawa | H04L 67/24 |
| 9,882,955 B2* | 1/2018 | Jamtgaard | H04L 67/02 |
| 10,397,236 B1* | 8/2019 | Chadha | G06F 11/3476 |
| 10,742,659 B1* | 8/2020 | Roka | H04L 63/0884 |
| 10,956,614 B2* | 3/2021 | Daniel | G06Q 20/401 |
| 11,127,001 B2* | 9/2021 | Tang | G06Q 20/3829 |
| 11,151,572 B2* | 10/2021 | Jain | G06Q 20/32 |
| 11,177,860 B2* | 11/2021 | Park | H02J 7/02 |
| 11,188,907 B1* | 11/2021 | Vijayvergia | G06Q 20/401 |
| 11,195,177 B1* | 12/2021 | Vijayvergia | G06Q 20/023 |
| 11,199,832 B2* | 12/2021 | Cerri | G05B 17/02 |
| 11,229,044 B2* | 1/2022 | Tang | H04W 72/1284 |
| 11,250,432 B2* | 2/2022 | Bernstein | G06Q 20/385 |
| 11,282,123 B2* | 3/2022 | Dietz | H04N 21/251 |
| 11,282,137 B2* | 3/2022 | McDonald | G06Q 20/204 |
| 11,284,251 B2* | 3/2022 | Rhee | G06Q 20/3674 |
| 2001/0034831 A1* | 10/2001 | Brustoloni | H04L 12/2856 713/151 |
| 2003/0009600 A1* | 1/2003 | Koyama | G06F 21/52 719/310 |
| 2004/0196978 A1* | 10/2004 | Godfrey | H04L 67/04 380/270 |
| 2009/0158402 A1 | 6/2009 | Ding | |
| 2013/0007459 A1* | 1/2013 | Godfrey | H04L 67/2828 713/175 |
| 2013/0046985 A1* | 2/2013 | Allen | H04L 9/3228 713/171 |
| 2013/0305331 A1* | 11/2013 | Kim | H04W 12/06 726/6 |
| 2014/0096202 A1* | 4/2014 | Matsuda | H04W 12/06 726/4 |
| 2014/0201517 A1 | 7/2014 | Corrion | |
| 2014/0259103 A1* | 9/2014 | Gunasekara | H04W 12/122 726/2 |
| 2014/0317413 A1* | 10/2014 | Deutsch | G06F 21/57 713/176 |
| 2016/0212194 A1* | 7/2016 | Palin | G06F 3/0484 |
| 2017/0063818 A1* | 3/2017 | Niewczas | H04W 4/21 |
| 2017/0272441 A1* | 9/2017 | McClintock | G06F 21/604 |
| 2019/0124058 A1* | 4/2019 | Kawahara | H04W 12/0431 |
| 2019/0238324 A1* | 8/2019 | Pau | H04L 9/0827 |
| 2020/0104473 A1* | 4/2020 | Yu | G06F 21/335 |
| 2021/0334393 A1* | 10/2021 | Hwang | G06F 3/1267 |

* cited by examiner

AUTHORIZATION METHOD FOR THE RELEASE OR BLOCKING OF RESOURCES AND CLIENT

CROSS-REFERENCE TO PRIOR APPLICATION

Priority is claimed to European Patent Application No. EP 18 212 665.6, filed on Dec. 14, 2018, the entire disclosure of which is hereby incorporated by reference herein.

FIELD

The present invention relates to an authorization method for the release or blocking of resources, which method can also be used offline. Moreover, the present invention relates to a corresponding client.

BACKGROUND

In conventional authorization methods for transactions or data transmission between clients, providers and resource owners, the connection of the involved parties must always be uninterrupted. Usually, a client's request is sent to a provider, who then asks for a release by the resource owner. The response relating to the resource release is then conveyed to the provider, whereupon the resource is released or blocked for the client by the provider. However, the connection between client and provider and between provider and resource owner must always be uninterrupted. Otherwise, an authorization might not be possible.

SUMMARY

In an exemplary embodiment, the present invention provides an authorization method for releasing or blocking resources. The method includes, in case there is no connection between a provider and a resource owner: wirelessly transmitting a resource request from a client to the provider via an agent; wirelessly transmitting an authorization request from the provider to the client via the agent; wirelessly transmitting the authorization request from the client to the resource owner; wirelessly transmitting a receipt comprising an authorization response from the resource owner to the client; wirelessly transmitting the receipt from the client to the provider; and releasing or blocking a first resource in accordance with the authorization response comprised in the receipt. The method further includes, in case a connection between the client and the resource owner is temporarily interrupted: wirelessly transmitting a second resource request from the client to the provider via the agent; wirelessly transmitting a second authorization request from the provider to the client via the agent; wirelessly transmitting a second receipt comprising a certificate issued by the resource owner in advance from the client to the provider; and releasing or blocking a second resource in accordance with the second receipt comprising the certificate.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
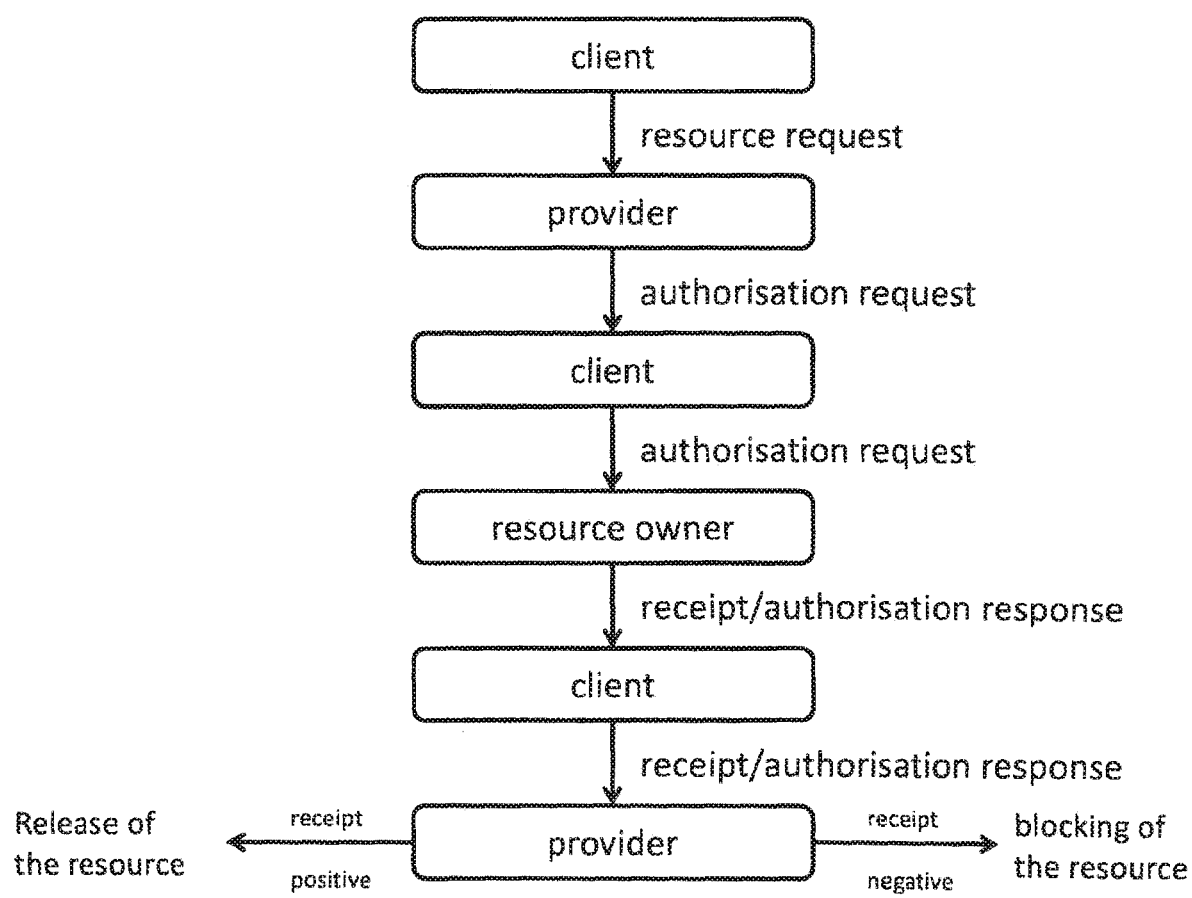
FIG. 1 shows a flowchart of an exemplary embodiment.

Exemplary embodiments of the present invention provide a method for carrying out an offline authorization and resource release or blocking, i.e. without active connection between provider and resource owner and/or between client and resource owner.

According to a first aspect, an authorization method for the release or blocking of resources is provided, comprising the following steps:

- via wireless communication, transmission of a resource request from a client to a provider, the transmission being made via an agent;
- via wireless communication, transmission of an authorization request from the provider to the client, the transmission being made via the agent;
- via wireless communication, transmission of the authorization request from the client to an resource owner;
- via wireless communication, transmission of a receipt comprising an authorization response from the resource owner to the client;
- via wireless communication, transmission of the receipt from the client to the provider; and
- release or blocking of the resource in accordance with the authorization response contained in the receipt.

The authorization request is preferably signed with a private key of the provider and comprises a public and a private portion. The public portion of the authorization request is accessible for the client and the private portion of the authorization request is encrypted with a public key of the resource owner.

This first aspect relates to a scenario where the provider is offline with respect to the resource owner.

A second aspect relates to a scenario where the client is offline with respect to the resource owner. The second aspect may be implemented on its own or in addition to or in combination with the first aspect. If there is temporarily no connection between client and resource owner, because the client is in an offline mode with respect to the resource owner, the authorization method according to the present invention comprises the following steps in contrast or in addition to the authorization method according to the first aspect as described above:

- via wireless communication, transmission of a resource request from a client to a provider, the transmission being made via an agent;
- via wireless communication, transmission of an authorization request from the provider to the client, the transmission being made via the agent;
- via wireless communication, transmission of an authorization confirmation comprising a certificate issued by the resource owner in advance from the client to the provider; and
- release or blocking of the resource in accordance with the receipt comprising the certificate.

It is assumed here that the provider is also offline with respect to the resource owner.

According to a further aspect, in which the client is offline, whereas the provider is online vis-à-vis the resource owner, the method comprises the following steps:

via wireless communication, transmission of a resource request from a client to a provider, the transmission being made via an agent;

via wireless communication, transmission of an authorization request from the provider to the resource owner;

via wireless communication, transmission of an identified authorization request from the resource owner to the provider;

via wireless communication, transmission of the identified authorization request from the provider to the client, preferably via the agent;

generation of a local receipt by the client; and via wireless communication, transmission of this receipt from the client to the provider, preferably via the agent;

transmission of the receipt from the provider to the resource owner;

validation of the receipt by the resource owner; and transmission of an authorization response from the resource owner back to the provider.

Eventually, the resource is released or blocked for the client by the provider.

The third aspect may be implemented on its own or in addition to or in combination with the first or second aspect.

In an exemplary embodiment, a method according to the present invention preferably further comprises the provision of a public and a private key for both the provider and the resource owner, wherein both public keys are known to the provider and the resource owner.

Preferably, the authorization request according to the third aspect is signed with a private key of the client and comprises a public and a private portion. The public portion of the authorization request is accessible to the provider and the private portion of the authorization request is encrypted with a public key of the resource owner.

Transmission is preferably effected by a wireless data transmission device. The wireless data transmission device may utilize near field communication (NFC), Bluetooth LE, a QR code, a barcode, or sound.

The agent may be an application on the client.

According to a further aspect, the present invention further comprises a client for releasing or blocking resources, wherein the client comprises a wireless communication interface adapted to transmit a resource request from the client to a provider, the transmission being made via an agent. The wireless communication interface is further configured to receive an authorization request from the provider to the client via the agent. Moreover, the wireless communication interface is adapted to transmit an authorization request from the client to a resource owner, to receive a receipt comprising an authorization response from the resource owner to the client and to transmit the receipt from the client to the provider.

In case of a temporary interruption of the connection between client and resource owner because of the client being in an offline mode, the wireless communication interface is further configured to send a resource request from the client to a provider, the transmission being made via an agent, to receive an authorization request from the provider to the client via the agent and to transmit a receipt comprising a certificate issued by the resource owner in advance from the client to the provider.

According to a further aspect, the invention further comprises a client for releasing or blocking resources, wherein the client comprises a wireless communication interface for transmitting a resource request from the client to a provider, the transmission being made via an agent. Moreover, the provider comprises a wireless communication interface. The wireless communication interface of the provider is further adapted to transmit an authorization request from the provider to the resource owner and to receive an identified authorization request from the resource owner to the provider. Moreover, the wireless communication interface of the provider is adapted to transmit the identified authorization request from the provider to the client via the agent. The client is adapted to generate a local confirmation and to transmit this confirmation from the client to the provider via the agent via wireless communication. The provider's wireless communication interface is further adapted to transmit the confirmation from the provider to the resource owner, to have the confirmation validated by the resource owner and to receive an authorization response from the resource owner back to the provider.

If the connection between provider and resource owner is temporarily interrupted, the wireless communication interface of the client is further adapted to transmit a resource request from a client to a provider, the transmission being made via an agent, to receive an authorization request from the provider to the client via the agent, the transmission being made via the agent, and to transmit an authorization confirmation from the client to the provider and compare it with a certificate generated in advance.

The present invention provides for a resource owner deciding on an authorization of a resource, a provider providing a resource and a client. Moreover, an agent requesting access to a resource on the client's demand is provided. The agent may also be an application on the client.

Client and resource owner as well as client and provider are connected, whereas provider and resource owner are not connected. In other words, the client is online as regards access to the resource owner, whereas the provider is offline. This connection may be wireless or not. Moreover, each of the provider and the resource owner possess a pair of private/public keys, both knowing each other's public key.

Since the client is online and the provider is offline, the provider must know the resource owner's public key so as to guarantee safe and secret communication between provider and resource owner via the client. The party communicating with the resource owner must not be capable of viewing or changing information only intended for the resource owner by the provider.

In view of FIG. 1, the method comprises the following steps, wherein data can be transmitted from the client via the agent or directly from the client: The client requests a resource from the resource owner. Upon transmission of the resource request to the provider by the client, the provider transmits a local authorization request back to the client. This authorization request is encrypted with the resource owner's public key and signed with the private key of the provider. The client transmits the local authorization request to the resource owner. The resource owner grants or rejects the authorization and transmits a receipt comprising the authorization response back to the client. The receipt is encrypted with the provider's public key and signed with the resource owner's private key. The receipt is then passed on to the provider by the client. The provider validates the receipt and compares it with the local authorization request; i.e. the provider analyzes the authorization response and releases or blocks the resource accordingly.

Here, the authorization request is signed with the provider's private key and comprises a public and a private portion. The public portion is i.a. accessible to the agent and the client, the private portion to the resource owner. The private portion of the authorization request is encrypted with the resource owner's public key, which is known to the provider. Thus, a confidential and fraud-proof communication between resource owners and providers is possible via a third entity, the client or the agent, so that the third entity is provided with data on the authorization. An asynchronous and deferred application of the method is also possible.

So as to preclude that authorization requests are used several times, an unambiguous identifier which is re-transmitted in the receipt may be used in the authorization request. Preferably, each identifier is valid for only one transaction.

Communication with the resource owner (also termed backend) is preferably encrypted and performed via Hyper-Text Transfer Protocol Secure (HTTPS) with Transport Layer Security (TLS) 1.2+. Communication between client and provider is preferably performed via QR code, barcode, NFC, Bluetooth LE, sound or the like.

The method will be described in the following for the case that the client is offline and the provider online. The client makes a local resource request to the provider, which may be made via an agent. The authorization request for the release of a resource is transmitted from the provider to the resource owner, which transmits back an identified authorization order assigned to the authorization request. This authorization order is signed with the resource owner's private key and encrypted with the client's public key. The provider transmits the authorization order to the client, also preferably via the agent. The client generates a local confirmation which is encrypted with the resource owner's public key and signed with the client's private key. This confirmation is transmitted from the client to the provider, preferably via the agent. The provider transmits the confirmation to the resource owner, which validates the confirmation and transmits an authorization response back to the provider.

In particular if the client is offline and the provider is online, the client must know the resource owner's public key so that a privileged and confidential communication between client and resource owner is possible via the agent. Thus, the party communicating with the resource owner must not be capable of viewing or changing information merely intended for the resource owner by the client.

Wireless and wired communication is possible in each case.

In the following embodiment, it is assumed that the involved entities, i.e. the client and the provider, are offline, but regularly online.

If the connection between client and resource owner is temporarily interrupted, since the client is temporarily offline, but there is at least temporarily a connection between resource owner and provider, an authorization method can anyhow be executed according to the present invention—although the client is offline.

To this end, the client receives a temporary offline certificate on actions to which it is entitled while the client and the resource owner are connected. If a resource request is transmitted from the client to the provider, the authorization request signed with the offline certificate is transmitted from the client to the provider. The provider now decides whether the requested resource can be released or is blocked. Once there is a connection between provider and resource owner, the signed offline requests are transmitted and examined by the resource owner.

Preferably, the used identifier is unambiguous so as to prevent the multiple use of certificates, resource requests, authorization requests and receipts.

With the offline certificate an authorization is possible even if there is only a local connection between client and provider. This certificate is preferably issued only for clients with verified identity and high reliability. The provider may determine certain parameters in advance (such as a maximum amount and information on credit worthiness in case of a payment authorization, the safety level in case of an access control, issue date etc.). Preferably, the client is regularly provided with an offline certificate comprising the corresponding parameters when the client and the resource owner (backend) are connected. In turn, when the provider and the resource owner are connected, the provider is preferably regularly provided with blacklists for the clients' offline certificates.

Thus, if the client and the provider are only locally connected without being connected with the resource provider at the time of the resource request, the authorization can anyhow be executed with the offline certificate. To this end, the provider generates a local authorization request that is encrypted with the resource owner's public key and signed with the provider's private key. The provider transmits a public portion of the local authorization request to the client. The client generates a local confirmation (receipt) which is assigned to the authorization request, encrypted with the resource owner's public key and signed with the client's private key. The public portion of the confirmation is transmitted to the provider together with the offline certificate. The provider validates the confirmation and examines the offline certificate and the public portion of the confirmation. The resource may be released or blocked upon examination by the provider. Once the provider and the resource owner are connected, any local authorization requests and confirmations are transmitted to the resource owner, i.e. the backend.

Wireless transmission and reception to and from the client is possible, e.g. via near field communication (NFC), Bluetooth LE, QR code, barcode or sound.

The present invention also relates to a client comprising a wireless communication interface and adapted to execute the method described above.

The present invention will be illustrated in more detail via the following examples. The cases in which the client is offline, the provider is offline or the client and the provider are offline will be discussed hereinafter.

Example 1

Example 1 relates to an access control to a building. The resource is in this case a door, the resource owner a server controlling access to the door, the provider a door lock, the client a person seeking access to a door and the agent an application on a mobile terminal or the like. It is further assumed that there is no connection between the door lock (provider) and the server (resource owner). In other words, the provider is offline in this case.

Upon a resource request by the application (agent), the door lock (provider) transmits the access or authorization request back to the application. The application in turn sends the opening request to the server (resource owner) which checks whether the user is authorized to open the door and whether the authorization requested is signed with the private key of the door lock. The name of the resource (such as "northern door") is evident to the user from the public portion of the authorization request. The authorization request further comprises a specific ID so as to preclude multiple use. The corresponding receipt comprising the authorization response is then sent back to the application and again passed on to the door lock, which verifies whether the receipt is signed with the private key of the server and whether the ID has not yet been used. If both prerequisites are fulfilled, the user can open the door.

The above example of an access control is only illustrative. The present invention may be used for any authorization process in which the provider is offline.

Example 2

Figure 2:
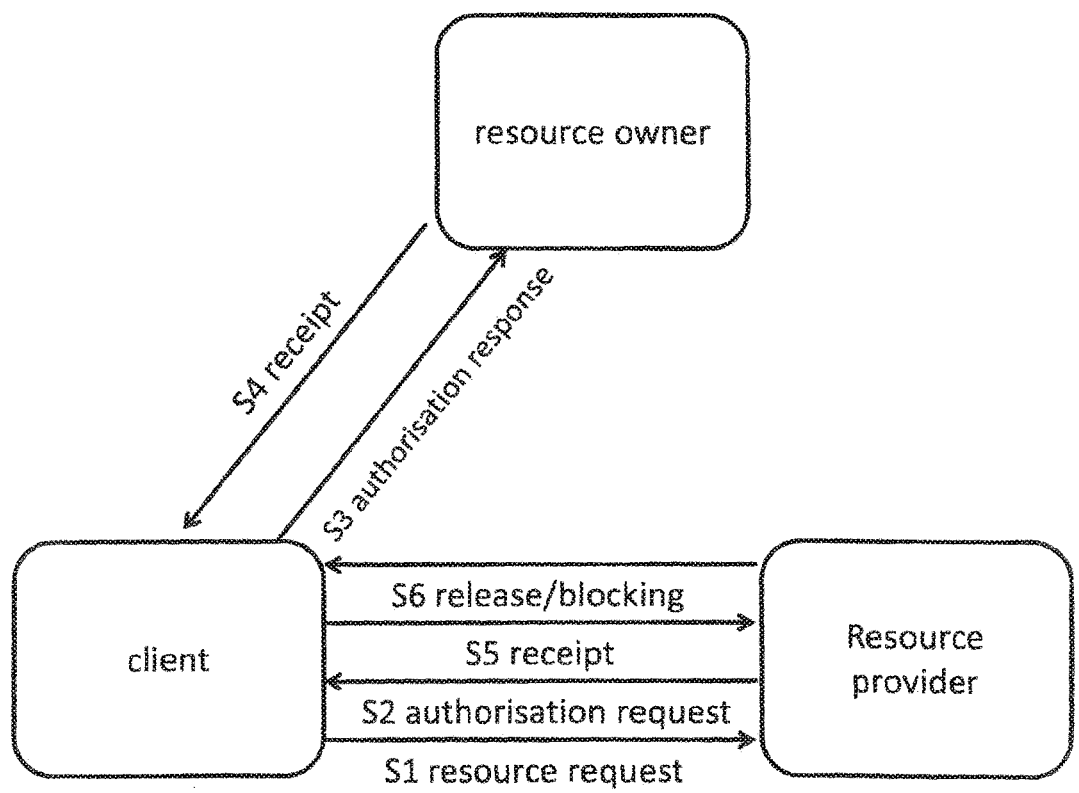
FIG. 2 shows a flowchart of an exemplary embodiment.

As shown in the following in Example 2 with reference to FIG. 2, the invention may also be used for a payment process. In this case, the commodity represents the resource, the payment platform the resource owner, a vendor or a point of sale (POS) system the provider, a customer the client or a mobile terminal and an application on the mobile terminal the agent. It is further assumed that there is no connection between the POS system or vendor (provider) and the payment platform (resource owner). In other words, the provider is offline.

Upon choosing a commodity, the customer communicates via the application on the terminal with a POS system (resource request (S1)). The POS system transmits the authorization request comprising the price and type of the commodity back to the application (S2). The shopping basket represents in this case the public portion of the authorization request. If the customer confirms the purchase, he/she receives the authorization request which is then transmitted by the application to the payment platform (S3). If the release is authorized by the payment platform, the customer or the application receives a receipt comprising the authorization response (S4), which is in turn transmitted to the POS system (S5), which can either release or block the commodities upon a successful examination (S6).

Example 3

A case in which there is no connection between the POS system (provider) and the payment platform (resource owner) and the customer (client) is temporarily offline will be explained in the following Example 3. In this example, both provider and client are offline.

This method first resembles Example 2, but here the customer in advance requires an offline certificate for communication with the POS system. Instead of a receipt being transmitted to and received by the payment platform, the offline certificate is transmitted to the POS system by the application. The POS system checks whether this offline certificate has been signed by the payment platform, whether the certificate is valid, whether the same authorization request has been signed therewith and whether there is an authorization. If so, the commodity is released. As soon as the POS system and the payment platform are connected, the certificate and the receipt are transmitted and entered.

Examples 2 and 3, which relate to a payment process so as to illustrate the present authorization method, do not restrict the present invention. The aforementioned method where the client and the provider are offline is also applicable to other processes requiring an authorization.

Example 4

Figure 3:
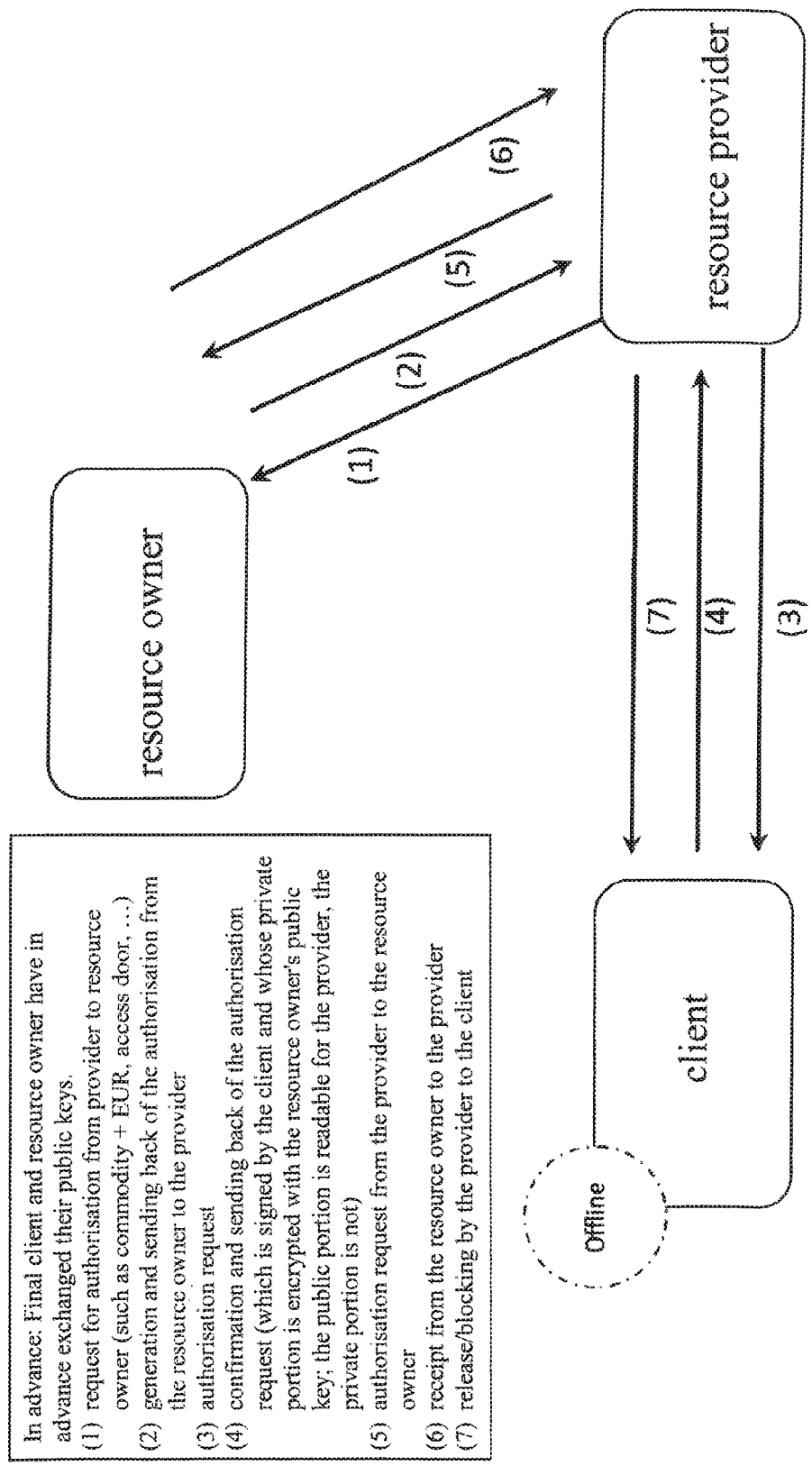
FIG. 3 shows an exemplary method in case the client is offline.

In the following, an exemplary method will be described with respect to FIG. 3 with the client being offline. In this case, the client and the resource owner must know each other's public key. First, the provider transmits an authorization request to the resource owner (1) (such as a commodity having a price, access to a door, etc.). The resource owner transmits an identified authorization request back to the provider (2) which is passed on to the client (3) by the provider. The client transmits a confirmation signed by the client back to the provider (4). The private portion of the confirmation is encrypted with the resource owner's public key. The confirmation is again transmitted by the provider to the resource owner (5) which transmits an authorization response back to the provider (6). Depending on the content of the authorization response, the provider then releases or blocks the resource (7).

Thus, according to the aforementioned method, resources can be released even when there is no connection between provider and resource owner or between client and resource owner. This method can be applied to the aforementioned payment and access authorization examples and additionally to any process requiring a specific client authorization and identification.

Although the invention has been illustrated and described in detail by the drawings and the respective description, the illustration and the detailed description are exemplary and do not restrict the invention in any way. It is of course possible for skilled persons to make changes and modifications without leaving the scope of the following claims. In particular, the invention also relates to embodiments with any combination of features mentioned or shown above with regard to different aspects and/or embodiments.

The invention may comprise individual features in the drawings, even if they are shown therein in combination with other features and/or have not been mentioned above.

Moreover, the terms "comprise", "have" and derivations thereof do not exclude other elements or steps. The indefinite article "a" or "an" and any derivations thereof do not exclude a plurality.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An authorization method for releasing or blocking resources, wherein the method comprises:
    based on there being no connection between a provider and a resource owner:
        wirelessly transmitting a resource request from a client to the provider via an agent;
        wirelessly transmitting a first authorization request from the provider to the client via the agent;
        wirelessly transmitting the first authorization request from the client to the resource owner;
        wirelessly transmitting a receipt comprising an authorization response from the resource owner to the client;
        wirelessly transmitting the receipt from the client to the provider; and
        releasing or blocking, by the provider, a first resource in accordance with the authorization response comprised in the receipt; and
    based on a connection between the client and the resource owner being temporarily interrupted:
        wirelessly transmitting a second resource request from the client to the provider via the agent;
        wirelessly transmitting a second authorization request from the provider to the client via the agent;
        wirelessly transmitting a second receipt comprising a certificate issued by the resource owner in advance from the client to the provider; and
        releasing or blocking, by the provider, a second resource in accordance with the second receipt comprising the certificate;
        wherein the first authorization request is signed with a private key of the provider and comprises a public portion and a private portion;
        wherein the public portion of the first authorization request is accessible to the client; and
        wherein the private portion of the first authorization request is encrypted with a public key of the resource owner.

2. The authorization method according to claim 1, wherein the method further comprises:
    providing a public key and a private key for both the provider and the resource owner;
wherein the provider and the resource owner know each other's public key.

3. The authorization method according to claim 1, wherein the agent is an application on the client.

4. One or more non-transitory computer-readable mediums having processor-executable instructions stored thereon for performing an authorization method for releasing or blocking resources, wherein the processor-executable instructions, when executed, facilitate the following being performed:
    based on there being no connection between a provider and a resource owner:
        wirelessly transmitting a resource request from a client to the provider via an agent;
        wirelessly transmitting a first authorization request from the provider to the client via the agent;
        wirelessly transmitting the first authorization request from the client to the resource owner;
        wirelessly transmitting a receipt comprising an authorization response from the resource owner to the client;
        wirelessly transmitting the receipt from the client to the provider; and
    releasing or blocking, by the provider, a first resource in accordance with the authorization response comprised in the receipt; and
        based on a connection between the client and the resource owner being temporarily interrupted:
        wirelessly transmitting a second resource request from the client to the provider via the agent;
        wirelessly transmitting a second authorization request from the provider to the client via the agent;
        wirelessly transmitting a second receipt comprising a certificate issued by the resource owner in advance from the client to the provider; and
        releasing or blocking, by the provider, a second resource in accordance with the second receipt comprising the certificate;
        wherein the first authorization request is signed with a private key of the provider and comprises a public portion and a private portion;
        wherein the public portion of the first authorization request is accessible to the client; and
        wherein the private portion of the first authorization request is encrypted with a public key of the resource owner.

* * * * *